W. V. JOHNSON.
OILER FOR MINE CAR WHEELS.
APPLICATION FILED JUNE 5, 1915.
1,183,981.
Patented May 23, 1916.
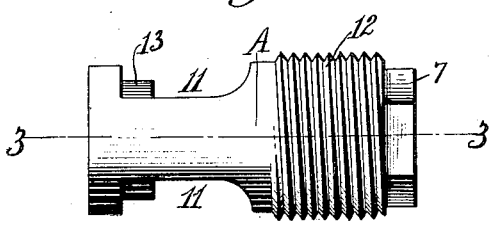
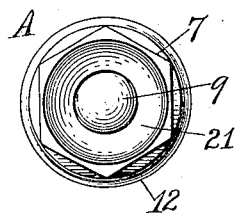
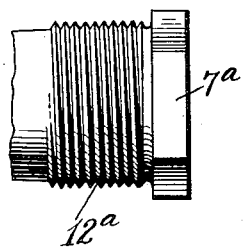
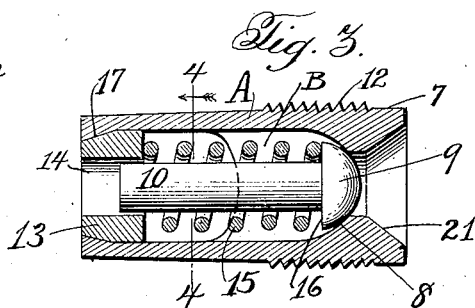
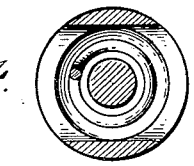
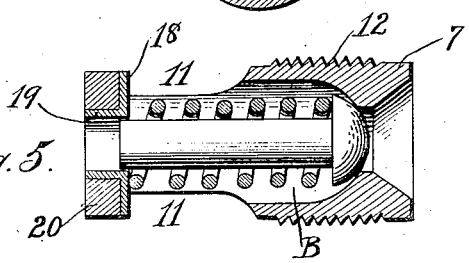

UNITED STATES PATENT OFFICE.

WARREN V. JOHNSON, OF BLOOMSBURG, PENNSYLVANIA, ASSIGNOR TO AMERICAN CAR AND FOUNDRY COMPANY, OF ST. LOUIS, MISSOURI, A CORPORATION OF NEW JERSEY.

OILER FOR MINE-CAR WHEELS.

1,183,981.

Specification of Letters Patent.  Patented May 23, 1916.

Application filed June 5, 1915. Serial No. 32,353.

*To all whom it may concern:*

Be it known that I, WARREN V. JOHNSON, residing at Bloomsburg, Pennsylvania, and being a citizen of the United States, have invented certain new and useful Improvements in Oilers for Mine-Car Wheels, of which the following is a full, clear, and exact description, such as will enable others skilled in the art to which it appertains to make and to use the same, reference being had to the accompanying drawings, which illustrate the preferred form of the invention, though it is to be understood that the invention is not limited to the exact details of construction shown and described, as it is obvious that various modifications thereof will occur to persons skilled in the art.

In said drawings: Figure 1 is a side elevational view of a lubricator forming the subject matter of the present invention. Fig. 2 is an end elevational view. Fig. 3 is a central longitudinal sectional view taken through the body portion of the lubricator substantially on the line 3—3 of Fig. 1 showing the body, spring and spring seat in section and showing the valve in side elevation. Fig. 4 is a transverse sectional view, the section being taken substantially on line 4—4 of Fig. 3. Fig. 5 is a modification hereinafter referred to. Fig. 6 is a further modification.

The object of the invention is to provide a lubricator which may be formed as a unit and subsequently screwed into position in the hub of a wheel, preferably such wheel as is commonly used in mine cars, in which it is essential that the lubricator shall be sufficiently rugged to withstand severe service conditions and of sufficient length to permit displacing the valve closing the opening into the body of the lubricator sufficiently to permit the insertion of the nozzle of a grease-gun or an oil-can.

One of the objects of the invention is to provide a lubricator which may be readily inserted in position in such a wheel and which may be removed for repairs or renewal of parts when desired.

Referring to the parts A indicates the body portion of my improved lubricator which is provided with a non-circular end portion 7 preferably hexagonal in form as shown in Fig. 2 to permit ready application of a wrench thereto for the purpose of screwing the lubricator into a wheel or removing it therefrom. The body portion A is hollow and is perforated longitudinally from end to end as shown in Figs. 3 and 5 and within its interior the area of the longitudinal perforation B is restricted at 8 circumferentially to provide a seat for the valve 9 which valve is provided with the stem portion 10 which is adapted to project into a spring seat at the opposite end of the body.

The wall or shell of the body portion is cut away as indicated at 11 in Figs. 1 and 5, the cut extending through the wall at both sides and into the aforesaid longitudinal perforation B. The body portion A is provided with an exterior screw-thread 12 which extends from the non-circular head portion 7 a sufficient distance longitudinally of the body of the lubricator to provide abundant bearing surface to interlock with a corresponding screw-thread formed in the orifice into which the lubricator is placed.

At the end of the body opposite the head 7 is a valve seat 13 which is provided with a through passage 14 in which is seated the relatively free end of the valve stem 10 and against the inner face of said valve seat 13 a spring 15 bears, said spring also bearing at its opposite end against the shoulder 16 of the valve 9.

The valve seat 13 may be secured in position in various ways, but I prefer to form the body portion of the lubricator with an annular wedge shaped seat 17. This annular seat is formed tapering as shown in Fig. 3 to adapt it to fit the tapered outer end of the valve seat 13 so that the pressure of the spring 15 will tend to hold said valve seat firmly locked in position.

A modified form of valve seat may be utilized, if desired, comprising merely a disk 18, having flanges 19 adapted to interlock with the end portion 20 of the lubricator body.

The non-circular head portion 7 may be formed after the central longitudinal portion has been bored in the body portion of the lubricator, or if desired, the body portion may be formed from a hexagonal bar of soft steel of a section sufficient to permit forming therefrom a modification in which the head portion 7ª shown in Fig. 6 shall project outwardly beyond the planes of the screw-thread 12ª shown in that figure.

The end of the body portion A within the head 7 is provided with a wedge shape opening 21 which is adapted to assist in positioning the end of a grease-gun or oil-can used to supply lubricant to the wheel or other article with which the lubricator hereinbefore described is associated.

Openings 11 in the side wall of the body A are sufficiently large to permit insertion of the valve seat 13 therethrough, though the spring and valve may be passed through the opening at the end of said body A opposite the head portion 7.

What I claim is:

1. A hollow lubricator body-portion formed as an integer comprising a non-circular head portion, a restricted valve seat intermediate the ends of said body portion, an exteriorly screw-threaded portion adjacent said head portion, portions of the wall of said body-portion being cut away intermediate its ends whereby a spring-seat and valve may be passed through said cut-away zone, in combination with a removable spring-seat adapted to be inserted from the side of said body portion and to automatically interlock with said body portion, a spring bearing on said spring seat and a valve bearing on said spring and said valve-seat.

2. A transversely perforated lubricator body provided with a longitudinal passage therethrough formed with a restricted portion intermediate its ends adapted to serve as a valve-seat and a second restricted portion adapted to serve as a seat for a spring-seat, in combination with a valve, a spring-seat removable through an opening intermediate the ends of said body and a spring bearing on said spring-seat at one end and said valve at its opposite end.

3. In combination in a lubricator, a body portion having an enlarged opening through the wall thereof intermediate its ends and having a longitudinal passage contracted at each end, a valve and a spring in said longitudinal passage and a spring seat insertible only through said enlarged opening and retained in position by said spring in one of said contracted ends of the longitudinal passage.

4. In a lubricator having a body portion adapted to be screwed in position and said body portion having an opening intermediate its ends, a reciprocatory valve adapted to close an opening in said body, a resiliently yielding member adapted to actuate said valve and a perforated spring seat adapted to be held in position by pressure of said yielding member.

5. In a lubricator having a body portion adapted to be screwed in position, said body portion having an opening intermediate its ends, a reciprocatory valve adapted to close an opening in one end of said body, a resiliently yielding member adapted to actuate said valve and a frusto-conical perforated spring seat adapted to be held in position by pressure of said yielding member.

6. In a lubricator, a body portion having an opening intermediate its ends, a spring seat insertible through said opening, said body portion having an end opening, and a valve and valve spring coöperating to close an opening leading into said body and to hold said spring seat in position.

7. In a lubricator, a body portion provided with intersecting longitudinal and transverse openings leading from the exterior through said body portion, a spring seat insertible only through said transverse opening, a spring holding said spring seat in position and a valve yieldingly held in position by said spring and spring seat.

In witness whereof I have hereunto set my hand in the presence of two witnesses.

WARREN V. JOHNSON.

Witnesses:
GENE C. HIDLAY,
R. C. KEPNER.